Patented Feb. 27, 1934

1,948,580

UNITED STATES PATENT OFFICE 1,948,580

NONCHALKING COATING COMPOSITION

Robert T. Hucks, Parlin, N. J., assignor to E. I. du Pont de Nemours & Company, Wilmington, Del., a corporation of Delaware No Drawing. Application February 5, 1931
Serial No. 513,787

5 Claims. (Cl. 134—79)

This invention relates to coating compositions. More particularly the invention relates to coating compositions, containing cellulose compounds and pigments, which do not chalk readily.

It has been observed that coating compositions which contain cellulose compounds, such as cellulose nitrate, and a white pigment such as zinc oxide, upon exposure to the weather exhibit a tendency to chalk badly. By the term "chalk" is meant that the surface of the coating becomes covered with a chalky excrescence. In places having a severe climate, such as in Florida, chalking ruins the appearance of an automobile in a very short time.

It is an object of this invention to overcome the chalking of coating compositions containing cellulose compounds. Other objects of the invention will be apparent as the description proceeds.

I have discovered that cellulose compound coating compositions which contain zirconium oxide as a pigment show a greater resistance to chalking than similar coating compositions containing pigments such as zinc oxide. For instance, outdoor exposure tests were carried on at Miami, Florida. Panels were soated with compositions containing a zinc oxide pigment in amounts varying from 6–15% by weight and other panels were coated with compositions containing zirconium oxide in equal amounts. The film forming material used in each case was cellulose nitrate. After continuous exposure for a period of three months the zinc oxide containing compositions were heavily chalked whereas those which contained zirconium oxide were practically free from chalking.

In the practice of my invention the zirconium pigment is prepared in any convenient manner and is incorporated into the coating composition by any known process of incorporating pigments into coating compositions.

The following are examples of typical protective coatings:—

Example 1

| | Per cent |
|---|---|
| Low viscosity nitrocellulose | 10 |
| Damar resin | 3 |
| Castor oil | 3 |
| Dibutyl phthalate | 3 |
| Zirconium oxide | 15 |
| Solvents and diluents | 66 |
| | 100 |

Example 2

| | Per cent |
|---|---|
| Low viscosity nitrocellulose | 10 |
| Damar resin | 3 |
| Castor oil | 3 |
| Dibutyl phthalate | 3 |
| Zirconium oxide | 9 |
| Solvents and diluents | 72 |
| | 100 |

Example 3

| | Per cent |
|---|---|
| Low viscosity nitrocellulose | 10.0 |
| Damar resin | 2.5 |
| Ester gum | 2.5 |
| Castor oil | 3.0 |
| Dibutyl phthalate | 3.0 |
| Zirconium oxide | 9.0 |
| Solvents and diluents | 70.0 |
| | 100.0 |

Example 4

| | Per cent |
|---|---|
| Low viscosity nitrocellulose | 10.0 |
| Damar resin | 2.5 |
| Ester gum | 2.5 |
| Castor oil | 3.0 |
| Dibutyl phthalate | 3.0 |
| Zirconium oxide | 15.0 |
| Solvents and diluents | 64.0 |
| | 100.0 |

The above examples may be varied widely. The cellulose nitrate which was used as the vehicle may be replaced with other cellulose esters or ethers such as cellulose acetate and ethyl cellulose. The damar resin may be substituted by any other resin in amounts compatible with the particular cellulose compound used. Other oils, either drying or nondrying, may be used in place of castor oil. Other softeners than dibutyl phthalate, such as diethyl phthalate and tricresyl phosphate, may be used. A list of satisfactory solvents and diluents can be obtained by reference to any standard work on cellulose lacquers.

My invention will find wide use in the coating of automobiles and of other materials which are exposed to the weather.

As many apparently widely different embodiments of this invention may be made without departing from the spirit and scope thereof, it is to be understood that I do not limit myself to the specific embodiments thereof except as defined in the appended claims.

I claim:

1. A coating composition adapted to give an opaque film resistant to chalking comprising a cellulose compound vehicle adapted to give a chalking film when combined with zinc oxide, and zirconium oxide as the sole white pigment in said composition.

2. A coating composition adapted to give an opaque film resistant to chalking comprising a cellulose nitrate vehicle adapted to give a chalking film when combined with zinc oxide, and zirconium oxide as the sole white pigment in said composition.

3. A coating composition adapted to give an opaque film resistant to chalking consisting of a cellulose compound vehicle adapted to give a chalking film when combined with zinc oxide, and zirconium oxide.

4. A coating composition adapted to give an opaque film resistant to chalking consisting of a cellulose nitrate vehicle adapted to give a chalking film when combined with zinc oxide, and zirconium oxide.

5. A coating composition adapted to give an opaque film resistant to chalking consisting of low viscosity nitrocellulose, a resin, castor oil, dibutyl phthalate, zirconium oxide, solvents and diluents.

ROBERT T. HUCKS.